(12) United States Patent
Maeda et al.

(10) Patent No.: US 6,378,949 B1
(45) Date of Patent: Apr. 30, 2002

(54) SEAT HAVING SEAT SURFACE PORTION MADE OF SURFACE-LIKE ELASTIC BODY

(75) Inventors: Minoru Maeda; Isao Kawashima, both of Tochigi-ken; Naohiro Takahashi, Saitama; Tsutomu Ao, Saitama; Masashi Ishii, Saitama, all of (JP)

(73) Assignees: TS Tech Co., Ltd.; Honda Giken Kogyo Kabushiki Kaisha, both of (JP)

( * ) Notice: Subject to any disclaimer, the term of this patent is extended or adjusted under 35 U.S.C. 154(b) by 0 days.

(21) Appl. No.: 09/565,314

(22) Filed: May 5, 2000

(30) Foreign Application Priority Data

May 6, 1999 (JP) ............................................. 11-126013

(51) Int. Cl.⁷ ................................................. A47C 7/02
(52) U.S. Cl. ................................................. 297/452.56
(58) Field of Search ........................ 297/452.1, 452.56, 297/284.2

(56) References Cited

U.S. PATENT DOCUMENTS

| 3,258,259 A | * | 6/1966 | Bohlin |
| 3,273,877 A | * | 9/1966 | Geller et al. |
| 4,869,554 A | * | 9/1989 | Abu-Isa et al. |
| 4,928,334 A | * | 5/1990 | Kita |
| 5,013,089 A | | 5/1991 | Abu-Isa et al. |
| 5,533,789 A | | 7/1996 | McLarty, III et al. |
| 5,632,526 A | * | 5/1997 | McLarty, III et al. |

FOREIGN PATENT DOCUMENTS

JP          8507935          8/1996

* cited by examiner

*Primary Examiner*—Milton Nelson, Jr.
(74) *Attorney, Agent, or Firm*—Dann, Dorfman, Herrell and Skillman, P.C.

(57) ABSTRACT

A seat having a seat back and a seat cushion, the seat back including a first frame and a first support member stretched within the first frame, the first support member being made of a first elastic body, the first elastic body including a first section having first tension suitable for supporting a person sitting on the seat, and second sections having second tension lower than the first tension.

4 Claims, 3 Drawing Sheets

SEAT HAVING SEAT SURFACE PORTION MADE OF SURFACE-LIKE ELASTIC BODY

BACKGROUND OF THE INVENTION

1. Field of the Invention

The present invention relates to an improvement of a seat forming a seat surface portion by stretching, within a frame of a frame body, an elastic body made of cloth or braided goods using at least elastic thread as warp or weft.

2. Description of Relevant Art

Conventionally, there has been already proposed a seat forming a seat surface portion by stretching a net-like elastic body within a frame of a frame body (U.S. Pat. No. 5,013,089, U.S. Pat. No. 5,533,789 and Japanese Patent Application Laid-open No.H8-507935).

This seat can be changed in shape differently from a normal seat by forming its seat surface portion of the net-like elastic body, and the seat surface portion can be provided with cushion properties and air permeability. Further, in this seat, a pad member, a spring member and the like which are necessary for forming the seat surface portion of the normal seat can be omitted so that the weight of the seat can be reduced. Furthermore, since the elastic body is thin, the seat can be assembled into shape having high space efficiency.

For stretching the elastic body within the frame of the frame body, in the case of the above-described conventionally proposed seat, the seat surface portion is formed by stretching one sheet of an elastic body having uniform tension within the entire surface of the frame body. However, a soft touch feeling and a fit feeling conforming a body pressure distribution of a person sitting on the seat can not be obtained by stretching the one sheet of elastic body having uniform tension within the entire surface of the frame body. Further, a posture of the person sitting on the seat is not stable and thus, a seat surface portion having excellent sitting feeling can not be formed.

BRIEF SUMMARY OF THE INVENTION

It is an object of the present invention to provide a seat forming a seat surface portion of an elastic body which has excellent sitting feeling and on which a posture of a person sitting on the seat can be stabilized by providing the seat surface portion with a soft touch feeling and a fit feeling conforming a body pressure distribution of the person sitting on the seat.

It is an object of the present invention to provide a seat forming a seat surface portion of an elastic body capable of forming, with a simple structure, the seat surface portion which has excellent sitting feeling and on which a posture of the person sitting on the seat can be stabilized.

According to a first aspect of the present invention, there is provided a seat having a seat surface portion made of an elastic body comprising cloth or braided goods using at least elastic thread as warp or weft, wherein elasticity distribution of the elastic body is changed, and the elastic body is stretched within a frame of a frame body, thereby forming the seat surface portion.

According to a second aspect of the invention, there is a seat having a seat surface portion made of an elastic body, in which a seat surface section from a lower side to an upper side except seat surface sections which positionally correspond to and support shoulder blades of a person sitting on the seat is formed into an elastic surface having tension suitable for supporting the person sitting on the seat, and the seat surface sections which positionally correspond to and support the shoulder blades of the person sitting on the seat are formed into an elastic surface having relatively lower tension.

According to a third aspect of the invention, there is a seat having a seat surface portion made of an elastic body, in which the seat surface portion is formed from two elastic sheets, one of the elastic sheets is made of cloth or braided goods using at least elastic thread as warp or weft which is stretched within the entire surface of the frame of the frame body, and the other of the elastic sheets is made of cloth or braided goods using at least elastic thread as warp or weft which is stretched within the seat surface section from the lower side to the upper side except the seat surface sections which positionally correspond to and support shoulder blades of a person sitting on the seat.

DETAILED DESCRIPTION OF THE INVENTION

Figure 1:
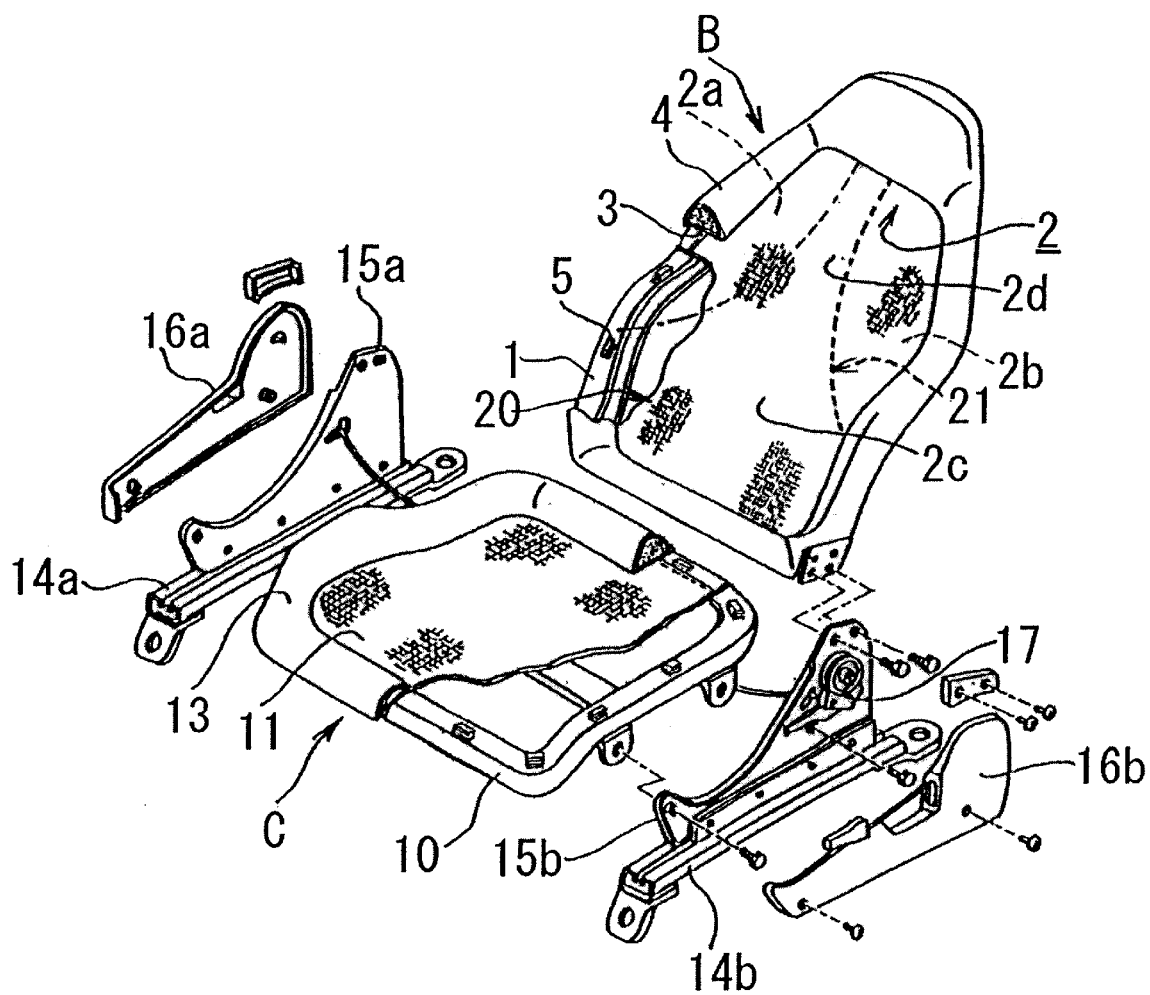
FIG. 1 is a developed perspective view showing the entire seat having a seat surface portion made of an elastic body according to the present invention.

The present invention will be explained below with reference to the drawings. As shown in FIG. 1, the illustrated embodiment is applied for assembling a seat back B of a vehicle seat. This seat back B is assembled mainly from a seat frame 1 which is a substantially quadrilateral frame body, an elastic body 2 forming a surface portion, a pad member 3 forming a bank, a bank skin 4 for covering the pad member 3.

The concrete structure will be explained. As the seat back frame 1, a metal frame having U-shape cross section which opens inward of the frame is used. This frame is formed into a substantially quadrilateral shape by axially bending each of sides such that the frame conforms with sitting posture of a person sitting on the seat. The seat surface portion is formed within the frame of this seat back frame 1 by stretching the elastic body 2 whose elasticity distribution is changed.

As the elastic body 2 forming the seat surface portion, cloth or braided goods using at least elastic thread as warp or weft is used. For example, it is possible to use cloth made of a plurality of elastomer monofilaments mixed and woven using a plurality of strands comprising fiber yarn used in interior cloth, or cloth or braided goods made by elastomer monofilaments of 1000 to 4000 denier woven with warp or weft which is elasticized and has air permeability.

Using the elastic body 2, a seat surface section from a lower side 2c to an upper side 2d except seat surface sections 2a and 2b which positionally correspond to and support shoulder blades of a person sitting on the seat is formed into an elastic surface having tension suitable for supporting the person sitting on the seat, the seat surface sections 2a and 2b which positionally correspond to support the shoulder blades of the person sitting on the seat are formed into elastic surfaces having relatively lower tension, and the elasticity distribution is partially changed, thereby providing the seat surface portion.

By changing the elasticity distribution, the seat surface section from the entire width of the lower side 2c to the center of the upper side 2d is formed into an elastic surface having fit feeling suitable for supporting a person sitting in the seat. Whereas, the seat surface sections 2a and 2b which positionally correspond to and support the shoulder blades of the person sitting on the seat are formed into elastic surfaces having soft touch feeling with weaker support as compared with elasticity of the main seat surface sections 2c and 2d.

Figure 2:
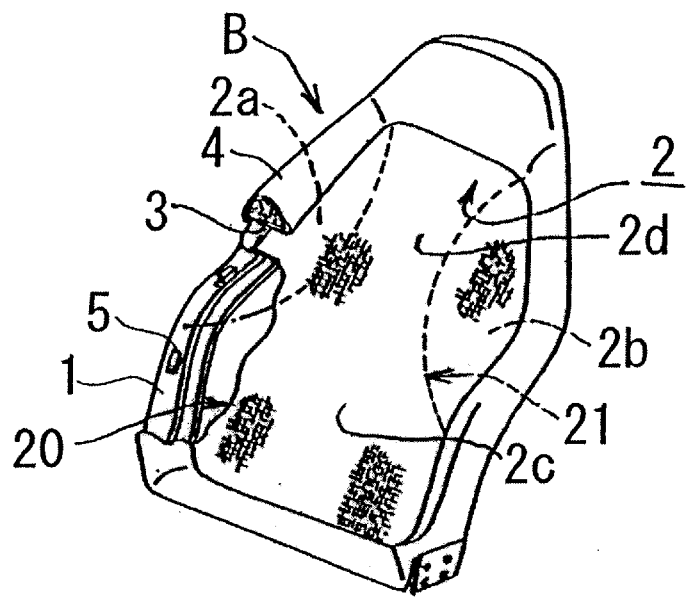
FIG. 2 is a perspective view showing a modification of a seat back of FIG. 1.

In the main seat surface sections 2c and 2d, as shown in FIG. 1, the upper side 2d may be formed continuously into a thin width shape so that this portion corresponds to substantially the central portion of a back from the entire width of the lower side 2c. Further, as shown in FIG. 2, the main seat surface sections 2c and 2d may also be formed such that the width is increased form the center to the upper side 2d. In any of these cases, it is possible to form the seat surface portion having excellent setting feeling conforming the body pressure distribution of the person sitting on the seat.

When the seat surface portion has one elastic sheet it is possible to form the seat surface portion such that the body pressure distribution of the person sitting on the seat become optimal by changing the thickness in accordance with a predetermined portion, by changing the number of weaving yarn per unit length or the number of knitting yarn per unit length. If the elastic body 2 comprises two elastic sheets which are superposed on each other, it is possible to form the seat surface portion such that the body pressure distribution of the person sitting on the seat become optimal with simple structure.

If two elastic sheets 20, 21 are superposed, it is possible to form the seat by superposing the elastic sheet 20 which is stretched within the entire frame of the seat back frame 1 with the elastic sheet 21 which is stretched in the seat surface section from the lower side 2c to the upper side 2d except the seat surface sections 2a and 2b which positionally correspond to and support the shoulder blades of the person sitting on the seat. In the case of the two superposed structure, it is preferable to stretch the elastic body 2 over the entire surface within the frame at front side, and to stretch the elastic sheet 21 except the seat surface sections 2a and 2b which positionally correspond to and support the shoulder of the person sitting on the seat at back side. Materials of the elastic sheets 20 and 21 may be the same or different from each other.

The elastic body 2 can be stretched within the frame of the seat back frame 1 by a plurality of retainers 5 provided on the front surface side of the seat back frame 1 at predetermined distances from one another along the axial direction. Each of the retainers 5 is made of metal plate which is bent into U-shape, and is mounted and fixed to the seat back frame 1 such that the lower/side of the retainer 5 is welded on the frame surface of the seat back frame 1 and the open side is directed outward.

Figure 3:
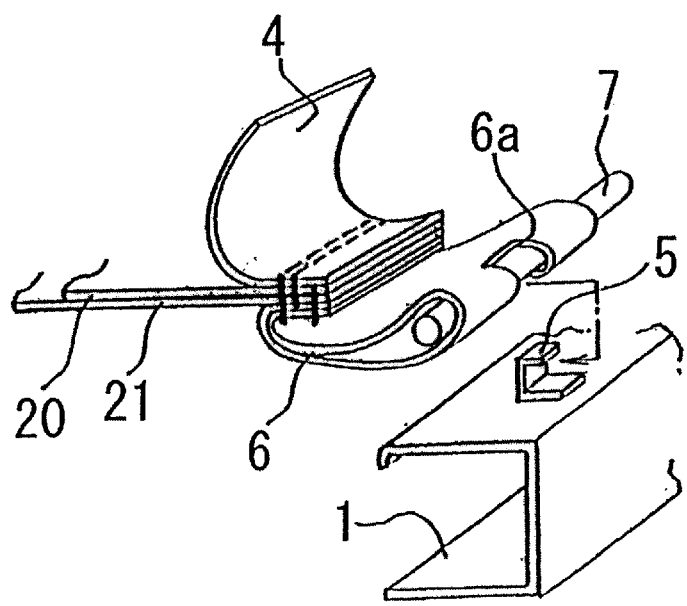
FIG. 3 is a partial developed view showing an assembled structure of the seat having the seat surface portion made of the elastic body according to the present invention.
Figure 4:
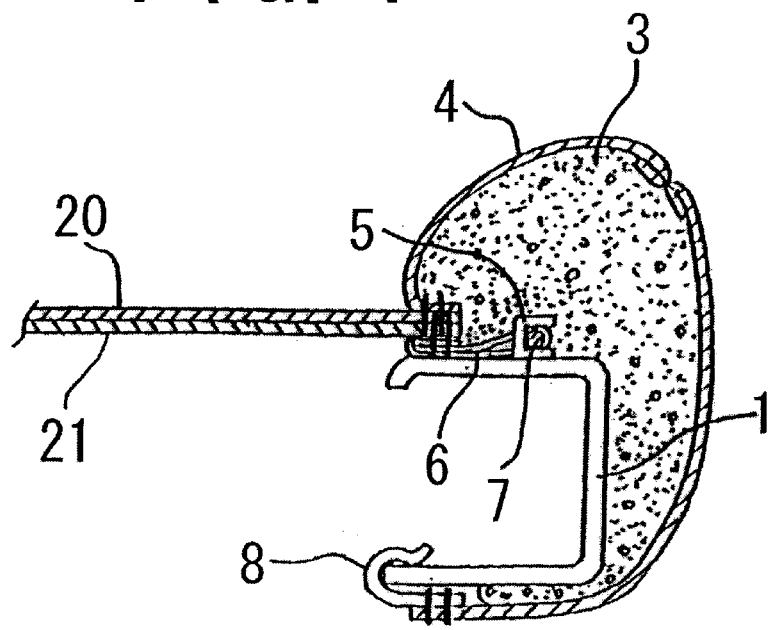
FIG. 4 is a partial sectional view showing the assembled structure of the seat having the seat surface portion made of the elastic body according to the present invention.

As shown in FIG. 3, the elastic body having the elastic sheets 20, 21 superposed on each other can be hooked and fixed at the retainers 5 by weaving a force cloth 6 along the end at back side. As the force cloth 6, plain weave having small extension and strong strength may be used. The force cloth 6 may be provided in the form of two sheets sewn together if the elastic body 2 comprise two sheets 20, 21 superposed on each other, or may be one sheet.

The force cloth 6 may be sewn along the end of the elastic body 2 as band-like bags provided by notching a bag edge to provide notches 6a at predetermined intervals from one another. This force cloth 6 exposes axial wire from the notch 6a and includes metal wire 7 in the bag, and is provided along the end of the elastic body 2 such that the elastic body 2 is stretched within the frame by hooking the body at the frame side of the seat back frame 1 using the retainers 5 which engage the axial wire of the metal wire 7.

The bank skin 4 which will be described later may be sewn together with the elastic body 2 and the force cloth 6 such that the skin 4 is positioned outside. In this case, the force cloth 6 is sewn with the elastic body 2 earlier than the bank skin 4 by sewing thread whose number and thickness are adjusted. Further, in addition to the sewing, hot melt adhesive may be applied for increasing the binding strength.

The periphery of the seat surface formed by the elastic body 2 is formed as a bank by incorporating the pad member 3 into the seat back frame 1 and covering with the skin 4. The pad member 3 is made of cushion foam body such as foamed urethane, and formed into a predetermined three-dimensional shape which can be fitted and fixed to the front, side back of the seat back frame 1 from an outer side of the frame 1. The pad member 3 may be formed such that it largely swells so as to assemble the bank having excellent holding ability.

Especially, portions of the pad member 3 from bulges at opposite sides to the lower sides are made as hold portions, and the upper side thereof is formed such as to largely swell as a head rest. The pad member 3 can be incorporated in each of sides of the seat back frame 1 individually, or can be formed into one integral unit in which the entire pad member 3 is continuous along the frame shape of the seat back frame 1.

As the bank skin 4, any of general genuine leather, tanned leather and fabric may be used. A front surface of the bank skin 4 is folded back from the end of the elastic body 2, and has a substantially C-shaped cross section such that it can envelop the pad member 3 incorporated in each of the sides of the seat back frame 1 from outside, and the entire skin can be sewn as an integral continuous skin.

In order to assemble the seat back B from the above described various members, the force cloth 6 is first stretched to hook the axial wire of the metal wire 7 on the retainers 5 of the seat back frame 1. With this operation, since the elastic body 2 is stretched by the force cloth 6 from periphery thereof the force cloth 6 can be stretched within the frame of the seat back frame 1 such as to keep the predetermined distributed elasticity regardless of whether the force cloth 6 comprises one sheet or two sheets superposed on each other.

Further, as described above, the force cloth 6 can be stretched with individual tension by providing for each of the elastic sheets 20 and 21. In this case, if the elastic sheets 20 and 21 are stretched at an interval from each other, deflection caused by the elastic sheet 20 stretched at the front side can be secured, and the elasticity distribution can be changed.

After the elastic body 2 is stretched, the pad member 3 is assembled into each of the sides of the seat back frame 1. The pad member 3 is assembled into the side such that the pad member 3 covers the retainers 5 of the seat back frame 1 including the force cloth 6. Thereafter, the front surface of the bank skin 4 is turned back from the ends of the elastic body 2 such as to envelop the pad member 3. The surface of the bank skin 4 can be mounted to the end by mounting a hook-like trim cord 8, winding the trim cord 8 toward the back surface of the seat back frame 1 and hooking the trim cord 8 at a flange of the seat back frame 1.

Figure 5:
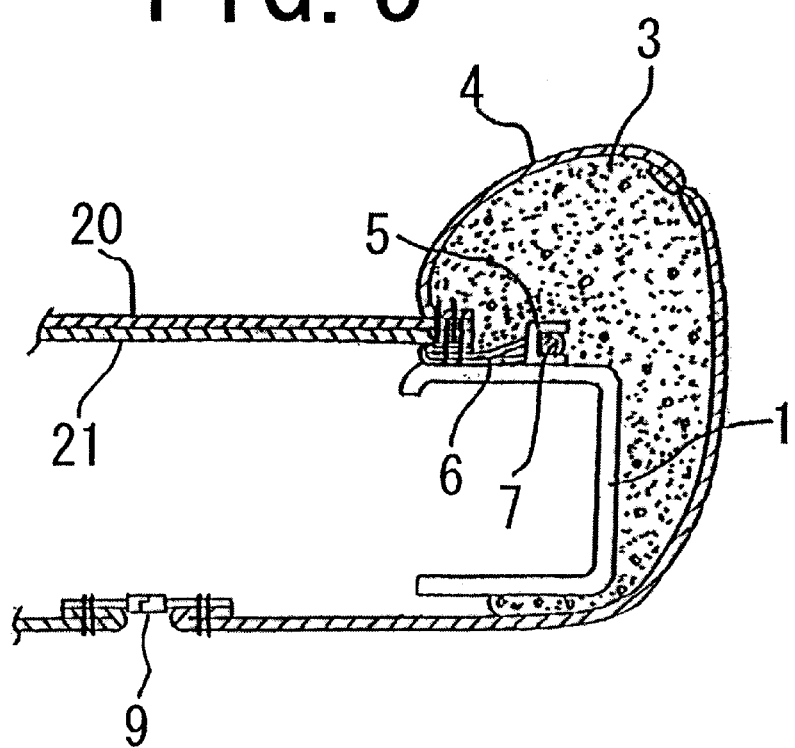
FIG. 5 is a partial sectional view showing a modification of the assembled structure of FIG. 4.

Instead of mounting the bank skin 4 by mounting the trim cord 8 to the end, it is also possible to mount a slide fastener 9 to the end of the skin 4 and to bring the slide fastener 9 and the skin 4 into engagement, thereby forming the seat back having a back cover as shown in FIG. 5.

In the case of this seat having the above-described structure, since the pad members 3 are disposed around the edges of the elastic body 2 a sense of disharmony caused by hard constituent member is not applied to a person sitting on the seat. Further, since the bank is formed such that after the pad member 3 is assembled into the frame of the seat back frame 1, the bank is enveloped with the bank skin 4, it is possible to assemble the seat such that a large swelling portion capable of holding the person sitting on the seat stably is formed.

Since the force cloth 6 of the elastic body 2 is hooked and stretched at the frame of the seat back frame 1 using the retainers 5 which engage the axial wire of the metal wire 7, the elastic body 2 can be formed as a seat surface portion having excellent sitting feeling conforming the body pressure distribution of the person sitting on the seat, and the elastic body 2 can easily be stretched within the frame of the seat back frame 1 with strong structure.

Although the above embodiment has been explained based on the seat back B, it is also possible to assemble a seat cushion C having a seat surface portion made of an elastic body by using a seat cushion frame 10 as a base, and incorporating an elastic body 11, a bank cushion pad 12, and a skin material 13 for enveloping the cushion pad 12.

If the seat cushion C is mounted to bracket plates 15a and 15b which are slidably supported uprightly by slide rails 14a and 14b and the bracket plates 15a and 15b are covered with exterior covers 16a and 16b, the back and forth position of the cushion can be adjusted like a normal seat. If one of the bracket plates (15b) is provided with a reclining mechanism 17, the entire seat can be formed as a reclining seat.

As described above, according to the first aspect of the present invention, there is provided a seat having a seat surface portion made of an elastic body comprising cloth or braided goods using at least elastic thread as warp or weft, wherein elasticity distribution of the elastic body is changed, and the elastic body is stretched within a frame of a frame body, thereby forming the seat surface portion. With this feature, it is possible to form the seat surface portion which has excellent sitting feeling conforming to body pressure distribution of a person sitting on the seat and which is capable of stabilizing a posture at the time of sitting.

According to the second aspect of the invention, there is provided a seat having a seat surface portion made of an elastic body in which a seat surface section from a lower side to an upper side except seat surface sections which positionally correspond to and support shoulder blades of a person sitting on the seat is formed into an elastic surface having tension suitable for supporting a person sitting on the seat, and the seat surface sections which support the shoulder blades of the person sitting on the seat are formed into elastic surfaces having relatively lower tension. With this feature, the seat surface section from the entire width of the lower side to the center of the upper side can be formed into the elastic surface having fit feeling suitable for supporting the person sitting on the seat, and the seat surface sections which positionally correspond to and support the shoulder blades of the person sitting on the seat can be formed into elastic surfaces having soft touch feeling with weaker support. Therefore it is possible to form the seat surface portion which has excellent sitting feeling conforming to body pressure distribution of a person sitting on the seat and which is capable of stabilizing a posture of the person at the time of sitting.

According to the third aspect of the invention, there is provided a seat having a seat surface portion made of elastic body in which the seat surface portion is formed from two elastic sheets, one of the elastic sheets is made of cloth or braided goods using at least elastic thread as warp or weft which is stretched within the entire surface of the frame of the frame body, and the other of the elastic sheets is made of cloth or braided goods using at least elastic thread as warp or weft which is stretched within the seat surface section from the lower side to the upper side except the seat surface sections which positionally correspond to and support the shoulder blades of a person sitting on the seat. With this feature, it is possible, with a simple structure, to form the seat surface portion which has excellent sitting feeling conforming to body pressure distribution of a person sitting on the seat and which is capable of stabilizing a posture at the time of sitting.

What is claimed is:

1. A seat having a seat back and a seat cushion, said seat back comprising a frame and support means stretched within said frame, said support means being made of an elastic body, wherein said elastic body comprises a first section having first tension suitable for supporting a person sitting on said seat, and second sections having second tension lower than said first tension, said second sections of said elastic body being positioned to correspond to the shoulder blades of the person sitting on said seat, and said first section of said elastic body extending from a lower side to an upper side of said elastic body between said second sections.

2. The seat according to claim 1, wherein said elastic body is made of material selected from a group consisting of cloth and braided goods, said cloth and braided goods having warp and weft, and at least one of said warp and weft being elastic thread.

3. The seat according to claim 1, wherein said elastic body comprises first and second elastic sheets, said first elastic sheet being stretched within the entire frame, said first elastic sheet having a first area corresponding to said first section and second areas corresponding to said second sections, and said second elastic sheet being superposed on said first area of said first sheet.

4. The seat according to claim 3, wherein each of said first and second elastic sheets is made of material selected from a group consisting of cloth and braided goods, said cloth and braided goods having warp and weft, and at least one of said warp and weft being elastic thread.

* * * * *